3,401,532
HYDROGEN RECOVERY WITH A METHANE
FREEZING POINT DEPRESSANT
Paul L. Charlesworth, Huddersfield, and Martin S. W.
Ruhemann, Brooklands, England, assignors to Petrocarbon Developments Limited, London, England
Filed May 13, 1965, Ser. No. 455,397
Claims priority, application Great Britain, May 19, 1964,
20,634/64
9 Claims. (Cl. 62—23)

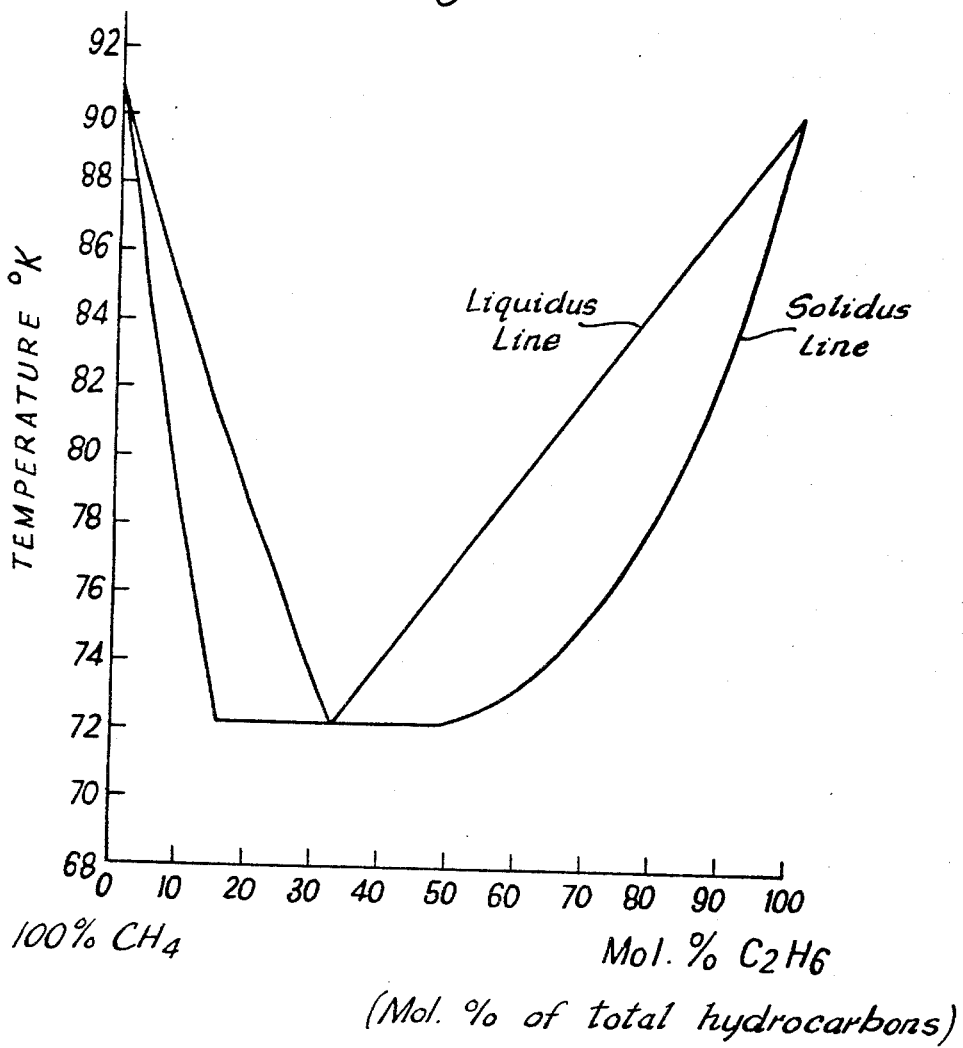

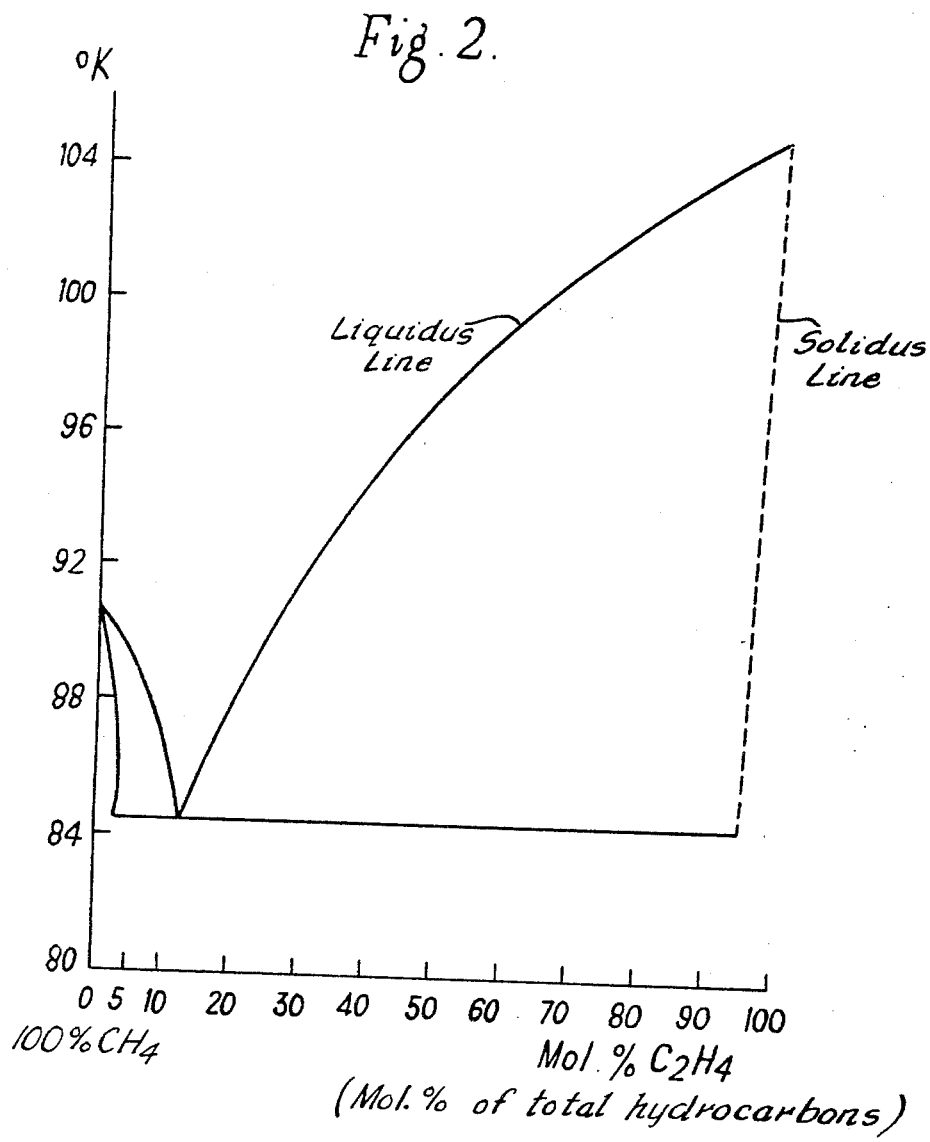

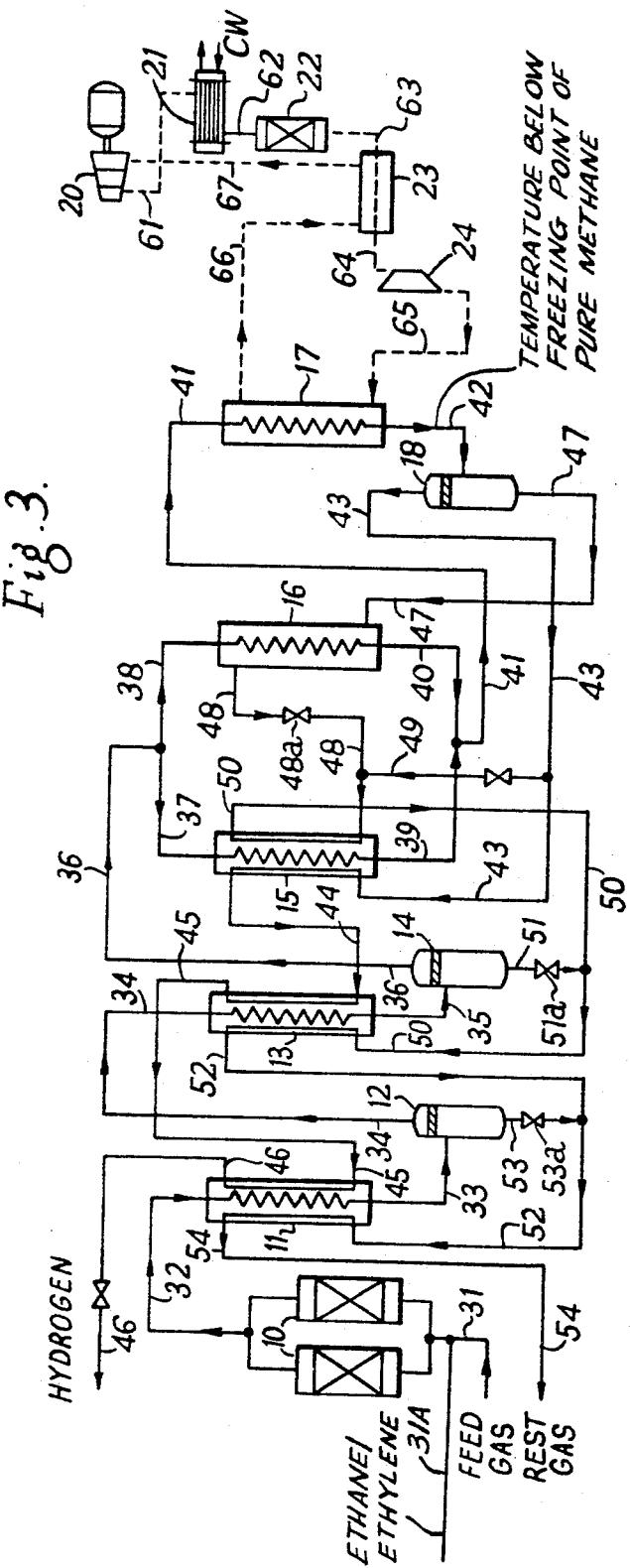

ABSTRACT OF THE DISCLOSURE

A process for purifying hydrogen gas by condensing methane and heavier hydrocarbons therefrom in plural cooling stages while maintaining sufficient ethane, ethylene, propane and mixtures thereof in the hydrocarbon gas prior to the final cooling stage thru temperature regulation in a first cooling stage in order to depress the freezing point of the methane containing condensate by at least 1.5° K. below the freezing point of pure methane such that additional amounts of methane will be condensed when the temperature is lowered below the freezing point of pure methane.

This invention relates to the purification of hydrogen, and more particularly relates to the removal of methane from a hydrogen-methane mixture by a low temperature condensation process to obtain pure hydrogen.

Methods for purifying hydrogen contaminated with methane or with methane and other light hydrocarbons such as ethane, ethylene and $C_3$ to $C_5$ hydrocarbons by cooling the impure hydrogen to condense the hydrocarbons and separating the gaseous phase which comprises purified hydrogen are known. When the impure hydrogen contains significant quantities of other hydrocarbons as well as methane, these hydrocarbons have hitherto been completely removed in preliminary cooling stages, leaving a residue gaseous mixture consisting of hydrogen and methane. This residual mixture has then been cooled further to liquefy the methane and the uncondensed purified hydrogen gas separated and recovered.

When low temperature condensation methods are used for the separation of methane from hydrogen gas contaminated with methane it is not normally practicable to cool the mixture below the freezing point of the liquid methane, 90.7° K. at atmospheric pressure. At this temperature the gaseous phase still contains about 3.5 molar percent of methane, the exact percentage depending on the superimposed pressure. Further cooling of the mixture in order to condense the residual methane gas causes the condensate to freeze which is undesirable. Hydrogen purified from methane simply by low temperature condensation therefore has hitherto contained at least 3.5 to 4 molar percent of uncondensed methane.

It is an object of this invention to obtain hydrogen of higher purity than has hitherto been obtained merely by a low temperature condensation process.

It is known that mixtures of methane with ethane or ethylene or propane in certain proportions have a freezing point lower than that of pure methane. It has now been found that a gaseous mixture consisting predominantly of hydrogen but containing methane and a hydrocarbon selected from ethane, ethylene or propane in the required proportions may be cooled to a lower temperature without freezing of condensed hydrocarbons than if the hydrogen contains methane only. The additional cooling, when carried out at an elevated pressure, suitably between 10 and 50 atmospheres, brings about the condensation of additional amounts of methane gas and the residual uncondensed gas is therefore more nearly pure hydrogen.

According to the invention there is provided a process for the purification of hydrogen gas contaminated with methane by cooling it to condense out an appreciable amount of the methane present in which process the freezing point of the methane is depressed, preferably by at least 1.5° K., by the presence of ethane or ethylene or propane or mixtures thereof, and the contaminated hydrogen gas is cooled to a temperature below the freezing point of pure methane but above the temperature to which the freezing point has been depressed, at an elevated pressure such that an additional amount of hydrocarbon is condensed as the temperature is lowered below the methane freezing point, and the gaseous purified hydrogen phase is separated from the liquid hydrocarbon phase. The cooling may suitably take place under a pressure of from 10 to 50, and preferably from 20 to 40 atmospheres, and the freezing point of the methane may preferably be deperssed by 3° to 5° K.

The hydrogen gas should be substantially free of compounds other than ethane, ethylene and propane having a freezing point above that of pure methane.

If the mixture of methane and hydrogen is derived from a source which was substantially free of ethane and ethylene, appropriate quantities of ethane or ethylene must be added before or during the cooling of the hydrogen-methane mixture.

Normally, however, the hydrogen-methane mixture is derived from refinery off-gas or reformer off-gas or from the separation of gases derived from cracking processes or other similar sources and accordingly originally contains ethane together with, in some cases, some $C_3$ to $C_5$ alkanes and, sometimes, ethylene. A typical molar composition of such an impure hydrogen gas would be 74% hydrogen, 13.5% methane, 7.4% ethane, 3.6% propane and 1.5% mixed butanes and pentanes. Such a gas must be cooled or otherwise treated in a preliminary step to remove the butanes and pentanes and any other components having a freezing point substantially above that of pure methane. When ethane or ethylene is present in the original mixture the extent of this preliminary cooling to separate the higher freezing point impurities may be controlled so that not all the ethane or ethylene is condensed. Mixtures of hydrogen and methane with ethane or ethylene or propane or mixtures thereof in proportions suitable for use in the process of the invention may thus be obtained, directly without the need for addition of ethane etc.

Although ethane or ethylene alone are normally used in the process of the invention, mixtures of ethane and ethylene may be used, provided that the overall proportions are such that the freezing point of the methane-ethane-ethylene mixture is below the temperature to which it is required to cool the gas. Similarly propane depresses the freezing point of methane. However, problems arise in re-evaporating propane at the low temperature level and in the preferred embodiment of the process it would not be used.

In the accompanying drawings FIGURE 1 shows the variation of freezing and melting point with composition for a mixture of methane and ethane at atmospheric pressure. The freezing point, i.e. the temperature at which the liquid begins to freeze, is given by the liquidus line and the melting point, i.e. the temperature at which the solid begins to melt, by the solidus line. FIGURE 2 shows the variation of freezing and melting point with composition for a mixture of methane and ethylene the liquidus line representing freezing point and the solidus melting point. The graphs refer to mixtures containing no hydrogen but the presence of hydrogen has a negligible effect, as does the use of superatmospheric pressures, at least up to about 60 atmospheres.

Referring to FIGURE 1 of the accompanying drawing it is apparent that mixtures of methane and ethane containing at least up to 95 molar percent ethane have a freezing point below that of pure methane. However, no additional advantage in terms of hydrogen purity is obtainable by the use of more than 33 molar percent ethane, i.e. the eutectic compositon, and the additional quantity of gas to be liquefied and, normally, subsequently evaporated at the lowest temperatures makes the use of such quantities undesirable. Accordingly the desired range of ethane content is from about 2 to about 33 molar percent of the hydrocarbon content.

Within the desired range the amount of ethane present is preferably chosen according to the degree of hydrogen purity required. To avoid unnecessary difficulties in evaporating the hydrocarbon content of the impure gas the amount of ethane present is preferably as small as possible consistent with the production of hydrogen of the required purity. Desirably the freezing point is reduced by from about 1.5° to about 5° K., i.e. the ethane proportion of the hydrocarbon content should be from about 2 to about 8 molar percent. 5 molar percent ethane reduces the freezing point to about 87.5° K. producing hydrogen of about 99 molar percent purity.

Referring to FIGURE 2 of the accompanying drawings, the broad range of ethylene content suitable for the invention is up to about 25 molar percent of the hydrocarbon content. Using arguments similar to those adopted for methane-ethane mixtures a desirable range is about 5 to about 13 molar percent, preferably about 5 to about 10 molar percent ethylene based on the hydrocarbon content.

Water and other impurities with high freezing points should be removed before employing the process of the invention.

Preferably the cooled hydrogen and hydrocarbon fractions are used to cool further quantities of impure gas, normally by indirect heat exchange. Where condensation is carried out successively in a number of stages to condense out higher hydrocarbons etc. the cool separated fractions may be recycled successively to earlier stages to cool the gas before each stage, thereby providing the bulk of the cooling required.

Preferably the liquid hydrocarbon fractions are expanded during the recycling process in order to evaporate them more easily and to provide additional cooling for the incoming impure gas. The impure gas desirably enters the system at a superatmospheric pressure such as 10 or 15 to 50 atmospheres, preferably 20 to 40 atmospheres and the pressure may be maintained at substantially the same or slightly lower values until the mixture is completely separated. The liquid fractions may subsequently be expanded, desirably to about atmospheric pressure during passage through or between heat exchangers. The pure hydrogen stream may be maintained at substantially the same pressure as the impure gas or may be expanded to any desired pressure.

In a preferred embodiment of the invention some of the purified hydrogen or possibly the impure hydrogen or other uncondensable gas is added to the separated methane-ethane fraction, desirably after expansion of the latter. The added hydrogen along with the hydrogen already dissolved in the methane-ethane fraction reduces the hydrocarbon partial pressure and causes the mixture to evaporate over a lower temperature range. The hydrogen content of the mixture is desirably about 8–12 molar percent of the mixture. Further details of the advantages and operation of this improvement may be found in British patent specification No. 930,682. It is sometimes desirable to warm the final liquid fraction slightly before expanding and adding some of the hydrogen or uncondensible gas, to avoid freezing of the liquid fraction.

As a result of the operation of this process it is generally possible to recover from 94 to 97% of the hydrogen present in the feed gas as substantially pure hydrogen, although the exact percentage recovered will depend on the percentage of impurity present in the feed gas.

FIGURE 3 of the accompanying drawings is a flow sheet of a hydrogen purification process which is a preferred embodiment of the invention.

Referring to FIGURE 3, the apparatus consists principally of a drier 10, and a series of heat exchangers 11, 13, 15, 16 and 17 with intervening separators 12, 14, 18 for separating the gas-liquid mixtures produced after cooling in the preceding heat exchanger.

In operating the process illustrated by FIGURE 3 with a feed gas which is a mixture of hydrogen and light hydrocarbons, up to and including pentanes, with some water, the feed gas is introduced at line 31 at an elevated pressure, e.g. 30 atmospheres, and dried in drier 10. It is then passed along line 32 to heat exchanger 11 where it is cooled to condense mainly the butane and pentane impurities but also some propane, and thence by line 33 to a separator 12 where the liquid phase is separated from the gaseous phase, which now comprises only hydrogen, methane, ethane and small residual quantities of propane. The gaseous phase passing from the separator 12 through line 34 is cooled in a second heat exchanger 13 which is carefully controlled so that the propane and a part of the ethane present in the mixture is condensed leaving a gaseous phase consisting in these circumstances of hydrogen and methane with a small proportion of ethane, e.g. a molar ratio of methane to ethane of 19:1. The partly condensed mixture is passed via line 35 to a separator 14 where the liquid fraction is separated from the gaseous fraction which leaves by line 36 and is divided into two parts, passing via lines 37 and 38 to two heat exchangers 15 and 16 arranged in parallel. The conditions, i.e. rate and proportion of flow etc. in each of exchangers 15 and 16 are so regulated that each part of the gaseous fraction is cooled to an equal extent. The cooled gaseous fractions leaving heat exchangers 15 and 16 through lines 39 and 40 are remixed and passed in line 41 to heat exchanger 17 where they are cooled further, to a temperature below the freezing point of pure methane but above the freezing point of the methane/ethane mixture to condense substantially all the methane and the residual ethane in the mixture without freezing the condensate. For a 19:1 molar ratio of methane to ethane the mixture may suitably be cooled to about 87.5° K., some 3° K. below the freezing point of pure methane. The partly condensed mixture passing from exchanger 17 by line 42 is separated in separator 18 and a gaseous fraction comprising substantially pure hydrogen, e.g. about 99 molar percent is obtained in line 43.

The gaseous hydrogen stream separated in separator 18 is returned successively through heat exchangers 15, 13 and 11 via lines 43, 44 and 45 respectively. In the heat exchangers it is warmed and provides cooling by indirect heat exchange for the condensation of hydrocarbon impurities in further amounts of feed gas. After leaving heat exchanger 11 it is available to line 46 at a pressure slightly below the pressure of the feed gas.

The separated hydrocarbon fractions are also used to cool incoming feed gas. The liquid methane-ethane fraction separated in separator 18 is returned by line 47 to heat exchanger 16 where it is warmed and provides cooling by indirect heat exchange. After leaving the heat exchanger 16 through line 48, it is expanded through a valve 48a to a pressure which may suitably be just above 1 atmosphere and mixed with a small quantity, e.g. about 1 to 4 preferably 2–4 molar percent of the purified hydrogen which is introduced through line 49, to reduce the temperature range over which it evaporates. It is then warmed in indirect heat exchanger 15, which it leaves by line 50 and mixed with the liquid condensate (ethane and propane) separated in separator 14 and subsequently expanded in valve 51a and introduced via line 51. The resulting mixture is warmed in heat exchanger 13, which it leaves by line 52, and is mixed with the liquid condensate (butanes and pentanes) separated in separator 12 and subsequently expanded in valve 53a and introduced through line 53, this mixture is then warmed in heat exchanger 11, finally passing out of the system through line 54.

External cooling is provided for the system by a closed nitrogen refrigeration cycle. A compressor 20 compresses nitrogen gas which then passes via line 61 to cooler 21 where the heat of compression is removed by cooling water. The compressed nitrogen is sent by line 62 to drier 22 thence through line 63 to exchanger 23 where it is further cooled and thence by line 64 to turbine 24 where it is expanded and cooled. The cool expanded nitrogen passes via line 65 to heat exchanger 17 where it provides cooling for the hydrogen-methane-ethane mixture, and is recycled through line 66, heat exchanger 23 and line 67 to the compressor 20. Other known methods of providing refrigeration may be employed if desired. For example, an expansion machine may be installed in the high pressure hydrogen product stream if hydrogen is required to be delivered below the original pressure.

If the feed gas introduced via line 21 is initially free from ethane, ethylene, and propane, an amount of one or more of these gases sufficient to reduce the freezing point of the condensate separated in separator 18 by the desired amount, may be added via line 31A.

The following example further illustrates the invention.

Example

Using the apparatus described above a gas mixture, after cooling in heat exchanger 11 and removing condensate in separator vessel 12 to eliminate high boiling constituents from the feed gas, has the following composition:

| | Percent mol |
|---|---|
| $H_2$ | 79.1 |
| $CH_4$ | 13.9 |
| $C_2H_6$ | 5.9 |
| $C_3H_8$ | 1.1 |

This gas is then cooled in heat exchanger 13 to a temperature carefully controlled to give the required methane to ethane ratio remaining in the vapour. At a pressure of 40 atmospheres and with the object of producing hydrogen at 99% purity this temperature is 134° K. After cooling to 134° K. the remaining vapour composition is:

| | Percent mol |
|---|---|
| $H_2$ | 91.6 |
| $CH_4$ | 7.8 |
| $C_2H_6$ | 0.6 |

In the final stage of cooling in heat exchangers 15 and 16 and then 17 this mixture is cooled to 89.0° K. to condense substantially all the methane and ethane, leaving a vapour phase containing 99 molar percent $H_2$. The condensate has the following composition:

| | Percent mol |
|---|---|
| $H_2$ | 2.2 |
| $CH_4$ | 89.9 |
| $C_2H_6$ | 7.9 | and has a freezing point of 85.8° K. which is below the freezing point of pure methane, i.e. 90.7° K. The low temperature of the final separation enables a high hydrogen purity to be achieved.

We claim:
1. In a process for the purification of hydrogen gas feed contaminated with methane by cooling to condense out an appreciable amount of said methane as a liquid condensate and separating uncondensed gas consisting of substantially pure hydrogen from said condensate, the improvement which comprises adding a sufficient amount of a lower hydrocarbon selected from the group consisting of ethane, ethylene, propane and mixtures thereof to the gas feed to depress the freezing point of said condensate by at least 1.5° K. below the freezing point of pure methane, and cooling said gas to a temperature below the freezing point of pure methane but above the temperature to which the freezing point of said condensate has been depressed, while maintaining a superatmospheric pressure such that an additional amount of methane is condensed as the temperature is lowered below the pure methane freezing point.

2. In a process for the recovery of purified hydrogen gas from a gas feed consisting essentially of hydrogen, methane and other hydrocarbons having up to five carbon atoms, including an intermediate boiling hydrocarbon selected from the group consisting of ethane, ethylene, propane and mixtures thereof, said ethane, ethylene, propane and mixtures thereof being present in an amount more than sufficient to reduce the freezing point of methane by 1.5° K., by cooling in a first stage to condense said intermediate boiling hydrocarbon as a first stage liquid condensate, separating the first stage liquid condensate from first stage residual uncondensed gas, cooling the first stage residual uncondensed gas in a second stage to condense an appreciable amount of the methane as a second stage liquid condensate and separating the second stage liquid condensate from second stage residual uncondensed gas which constitutes the purified hydrogen gas, the improvement which comprises regulating the temperature of the first cooling stage so that only a part of said ethane, ethylene, propane and mixtures thereof is condensed and the first stage residual uncondensed gas consists essentially of hydrogen, methane and sufficient of said ethane, ethylene, propane and mixtures thereof to depress the freezing point of the second stage liquid condensate by at least 1.5° K., and cooling the first stage residual uncondensed gas in the second stage while in the presence throughout the second stage of the condensed liquid components therein and without removal thereof, to a temperature below the freezing point of pure methane but above the temperature to which the freezing point of the second stage condensate has been depressed, while maintaining a superatmospheric pressure such that an additional amount of methane is condensed as the temperature is lowered below the pure methane freezing point.

3. A process as claimed in claim 2 wherein the second stage residual uncondensed gas and the second stage liquid condensate are employed to cool incoming gas by indirect heat exchange in a plurality of cooling stages, said condensate being expanded to about atmospheric pressure before passing to a cooling stage other than the final cooling stage, and hydrogen gas is added to said condensate in an amount of from 2 to 4 molar percent after expansion of said condensate.

4. A process as claimed in claim 2 wherein substantially all hydrocarbons, other than ethane, ethylene, propane and mixtures thereof, having freezing points above the freezing point of pure methane, are removed in the first cooling stage.

5. A process as claimed in claim 2 wherein substantially all hydrocarbons other than ethane, ethylene, propane and mixtures thereof, having freezing points above the freezing point of pure methane, are removed prior to the first cooling stage.

6. A process as claimed in claim 2 wherein the superatmospheric pressure is from 10 to 50 atmospheres.

7. A process as claimed in claim 2 wherein the first stage residual uncondensed gas consists essentially of hydrogen, methane and ethane, the ethane being present in an amount of from 2 to 33 molar percent of the total methane plus ethane content.

8. A process as claimed in claim 2 wherein the first stage residual uncondensed gas consists essentially of hydrogen, methane and ethylene, which is present in an amount from 5 to 13% of the total methane plus ethylene content.

9. A process as claimed in claim 2 wherein the freezing point of the second stage liquid condensate is depressed by from 3 to 5° K. and the superatmospheric pressure is from 20 to 40 atmospheres.

References Cited

UNITED STATES PATENTS

| | | |
|---|---|---|
| 2,591,658 | 4/1952 | Haringhuizen. |
| 2,983,585 | 5/1961 | Smith _____ 62—23 X |
| 3,011,589 | 12/1961 | Meyer. |
| 3,062,015 | 11/1962 | Cost _____ 62—23 X |
| 3,119,677 | 1/1964 | Moon et al. _____ 62—23 |

NORMAN YUDKOFF, *Primary Examiner.*

V. W. PRETKA, *Assistant Examiner.*